US008949660B1

(12) United States Patent
Pupius et al.

(10) Patent No.: US 8,949,660 B1
(45) Date of Patent: Feb. 3, 2015

(54) REMOTE DEOBFUSCATION OF COMPRESSED CODE

(71) Applicant: Google Inc., Mountian View, CA (US)

(72) Inventors: Daniel Felix Pupius, San Francisco, CA (US); Mark William Rawling, Sunnyvale, CA (US); Bradley Garett Hawkes, Sunnyvale, CA (US); Adam Richard De Boor, Bainbridge Island, WA (US); Joseph Schorr, New York, NY (US); John Joseph Lenz, Santa Cruz, CA (US); Nick Santos, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 229 days.

(21) Appl. No.: 13/714,350

(22) Filed: Dec. 13, 2012

Related U.S. Application Data

(60) Provisional application No. 61/570,783, filed on Dec. 14, 2011.

(51) Int. Cl.
G06F 11/00 (2006.01)
G06F 11/14 (2006.01)

(52) U.S. Cl.
CPC .................. G06F 11/1402 (2013.01)
USPC ........................................... 714/4.4

(58) Field of Classification Search
CPC ....................................... G06F 21/60
See application file for complete search history.

(56) References Cited

U.S. PATENT DOCUMENTS

| | | | |
|---|---|---|---|
| 7,725,574 B2 * | 5/2010 | O'Connell et al. | 709/224 |
| 7,966,664 B2 * | 6/2011 | Makkinejad | 726/26 |
| 8,819,819 B1 * | 8/2014 | Johnston et al. | 726/22 |
| 2006/0075500 A1 * | 4/2006 | Bertman et al. | 726/24 |
| 2007/0174419 A1 * | 7/2007 | O'Connell et al. | 709/217 |
| 2009/0300774 A1 * | 12/2009 | Makkinejad | 726/27 |
| 2010/0332993 A1 * | 12/2010 | Bousseton et al. | 715/738 |
| 2012/0158823 A1 * | 6/2012 | Ahuja et al. | 709/203 |
| 2014/0189499 A1 * | 7/2014 | Gigliotti et al. | 715/236 |
| 2014/0237241 A1 * | 8/2014 | Kurosawa et al. | 713/168 |
| 2014/0283041 A1 * | 9/2014 | Cao et al. | 726/22 |

* cited by examiner

Primary Examiner — Christopher McCarthy
(74) Attorney, Agent, or Firm — Birch, Stewart, Kolasch & Birch, LLP.

(57) ABSTRACT

Systems and methods for remotely deobfuscating JavaScript are provided. In some aspects, a method includes sending obfuscated code from a server to a browser, receiving a deobfuscation request at the server over a network, and deobfuscating an error in the deobfuscation request at the server.

20 Claims, 6 Drawing Sheets

REMOTE DEOBFUSCATION OF COMPRESSED CODE

RELATED APPLICATIONS

This application claims the benefit under 35 U.S.C. §119(e) of U.S. Provisional Application No. 61/570,783, filed Dec. 14, 2011, and entitled "Remote Deobfuscation of Compressed Code," the entire disclosure of which is incorporated herein by reference.

BACKGROUND

The subject technology generally relates to deobfuscation of compressed code.

JavaScript is obfuscated prior to transmitting to users to make the code smaller while allowing developers to use human-readable symbols during development. The obfuscated JavaScript is transmitted from a dedicated static JavaScript server to a browser. Meanwhile, HyperText Markup Language (HTML) and data are sent to the browser from a frontend server. If the JavaScript fails to execute correctly, the browser sends JavaScript error reports to the frontend server. JavaScript error reports include JavaScript stack traces and/or error messages that occurred in obfuscated code and contain obfuscated symbols and strings. Deobfuscation is performed at the frontend server to create readable stack traces and/or error messages for monitoring and debugging. As a result, the load of deobfuscation is on the frontend server.

SUMMARY

The subject technology provides remote deobfuscation of obfuscated JavaScript. JavaScript error reports from a browser may be received by a frontend server and the frontend server may then make a deobfuscation request to a JavaScript server over a network, and deobfuscation is performed at the JavaScript server. Readable error messages and/or stack traces may be sent back to the frontend server which then logs the error reports with the results of the deobfuscation. Consequently, the frontend server is freed from the load of deobfuscation. The subject technology also avoids sending error reports directly to the JavaScript server from the browser that makes it difficult to correlate errors because the JavaScript server may be used by multiple clients.

In one aspect, the disclosed subject matter can be embodied in a method that includes sending obfuscated code from a server to a browser, receiving a deobfuscation request associated with an error report at the server over a network when the obfuscated code fails to execute correctly at the browser, and deobfuscating an obfuscated error in the error report associated with the deobfuscation request at the server.

In another aspect, the disclosed subject matter can be embodied in a non-transitory computer-readable medium that includes instructions. The instructions include code for sending obfuscated code to a browser, receiving a deobfuscation request associated with an error report over a network when the obfuscated code fails to execute correctly at the browser, and deobfuscating an obfuscated error in the error report associated with the deobfuscation request.

In a further aspect, the disclosed subject matter can be embodied in a system that includes a JavaScript server configured to send obfuscated JavaScript to a browser, receive a deobfuscation request associated with a JavaScript error report over a network when the obfuscated JavaScript fails to execute correctly at the browser, and deobfuscate an obfuscated error in the error report associated with the deobfuscation request.

Various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
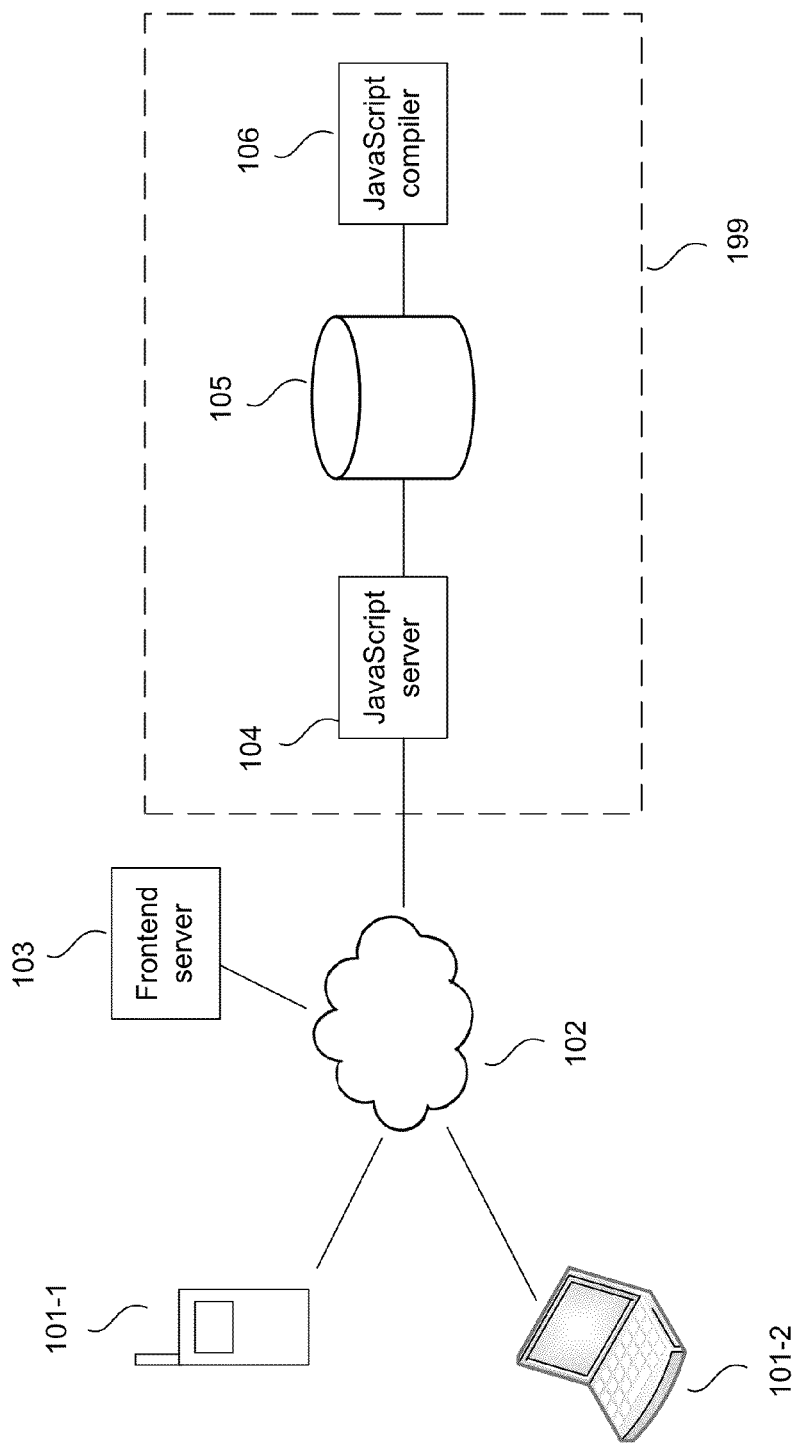
FIG. 1 illustrates a block diagram of an example of a system for remotely deobfuscating obfuscated JavaScript.

FIG. 1 illustrates a block diagram of an example of a system 100 for remotely deobfuscating obfuscated JavaScript. A plurality of user devices, such as user devices 101-1 and 101-2, are coupled to a frontend server 103 and a JavaScript system 199 via a network 102. The network 102 may be, e.g., the Internet, an intranet, a local area network, a cellular network or other communication networks. The JavaScript system 199 may include a JavaScript server 104, a storage device 105 and a JavaScript compiler 106 coupled in series. The frontend server 103 may send HTML and data to user devices 101-1 and 101-2 over the network 102, and the JavaScript server 104 may serve obfuscated JavaScript to the user devices 101-1 and 101-2 over the network 102. The frontend server 103 may also receive a JavaScript error report from user devices 101-1 and 101-2 and send a deobfuscation request to the JavaScript server 104, e.g., over the network 102. The JavaScript error report may include a JavaScript stack trace and/or an error message that occurred in obfuscated code and contain obfuscated symbols and strings. A JavaScript stack trace may provide information on a function call leading to an error, and a JavaScript error message may provide information on where and what the problem is. The deobfuscation request may contain information about the JavaScript stack trace and/or error message in the error report.

The JavaScript server 104 may perform deobfuscation, and send readable stack trace and/or error message back to the frontend server 103, e.g., over the network 102. The frontend server 103 may then log the error report with the results of the deobfuscation.

Obfuscation as used in this disclosure may include a minification or reduction in a size of code (e.g., Javascript code) by removing unnecessary characters from a source code. For example, long variable names may be changed to shorter names. Obfuscation may also encompass changing certain variable strings to other strings and variables to make the code less readable, such as for security purposes. Deobfuscation includes rendering of obfuscated code into the original code.

Figure 2:
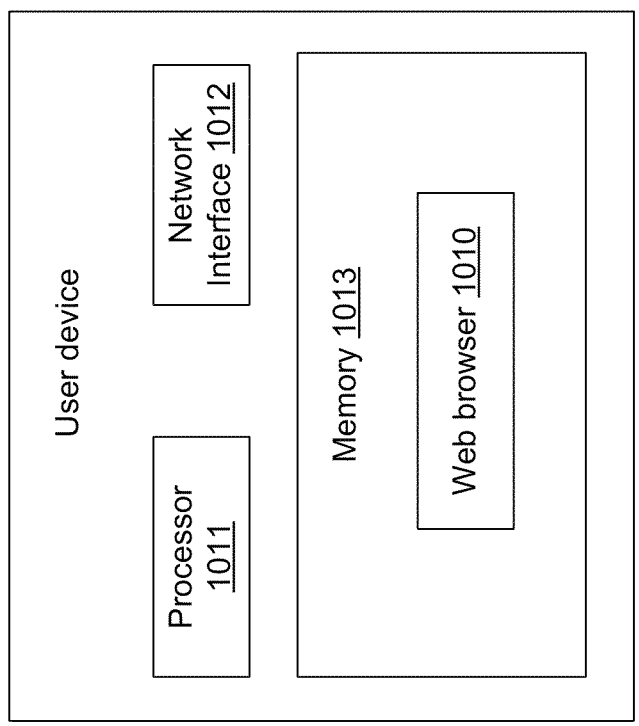
FIG. 2 illustrates a block diagram of an example of a user device shown in FIG. 1.

FIG. 2 illustrates a block diagram of an example of the user device 101-1 shown in FIG. 1. The user device 101-1 may include a processor 1011, a network interface 1012 and a memory 1013. The processor 1011 is configured to execute computer instructions that are stored in a computer-readable medium, for example, the memory 1013. The processor 1011 may be a central processing unit (CPU). The network interface 1012 is configured to allow the user device 101-1 to transmit and receive data in the network 102. The memory 1013 stores data and instructions. As illustrated, the memory 1013 may store a web browser 1010. The web browser 1010 may receive HTML and data from the frontend server 103 and obfuscated JavaScript from the JavaScript server 104. The web browser 1010 may also send JavaScript error reports to the frontend server 103. The web browser 1010 may be any commercially available web browsers.

The user device 101-1 may be, e.g., a laptop computer, a desktop computer, a tablet computer, a mobile phone, a smartphone, or a personal digital assistant (PDA). Other devices can also implement the functionalities of the user device 101-1.

Figure 3:
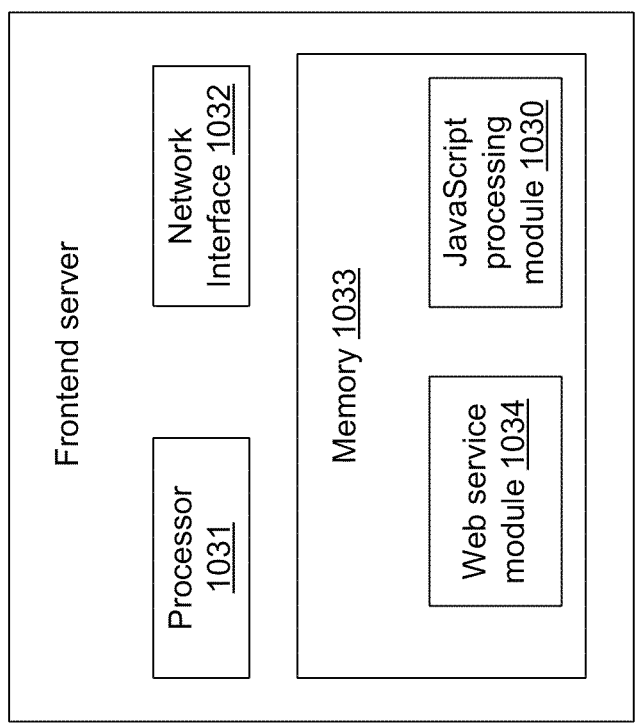
FIG. 3 illustrates a block diagram of an example of the frontend server shown in FIG. 1.

FIG. 3 illustrates a block diagram of an example of the frontend server 103 shown in FIG. 1. The frontend server 103 may include a processor 1031, a network interface 1032, and a memory 1033. The processor 1031 is configured to execute computer instructions that are stored in a computer-readable medium, for example, the memory 1033. The processor 1031 may be a central processing unit (CPU). The network interface 1032 is configured to allow the frontend server 103 to transmit and receive data in the network 102. The network interface 1032 may include one or more network interface cards (NICs). The memory 1033 stores data and instructions. As illustrated, the memory 1033 may store a web service module 1034 that may control the processor 1031 to communicate with user devices 101-1 and 101-2 to deliver HTML and data thereto. The memory 1033 may also store a JavaScript processing module 1030 which may control the processor 1031 to receive a JavaScript error report from the web browser 1010, generate a deobfuscation request which includes information about a JavaScript stack trace and/or an error message in the error report, send the deobfuscation request to the JavaScript server 104, and receive readable stack traces and/or error messages from the JavaScript server 104 after deobfuscation. Although FIG. 1 only shows one frontend server 103, the system 100 may include more frontend servers.

Reverting back to FIG. 1, JavaScript compiler 106 in the JavaScript system 199 may receive JavaScript source code and create obfuscated JavaScript. JavaScript error reports from the web browser 1010 or a debugger in the web browser 1010 may include JavaScript stack traces and/or error messages. The JavaScript compiler 106 may also create source maps used to deobfuscate the JavaScript stack traces, and/or predefined error maps used to deobfuscate the JavaScript error messages. The storage device 105 may be coupled to the JavaScript compiler 106 and store the compiled and obfuscated JavaScript, the source maps and the predefined error maps. The storage device 105 may be any commercially available storage device. The JavaScript server 104 may serve the obfuscated JavaScript to user devices 101-1 and 101-2 over the network 102. Although FIG. 1 only shows one JavaScript system 199, the system 100 may include more JavaScript systems.

Figure 4:
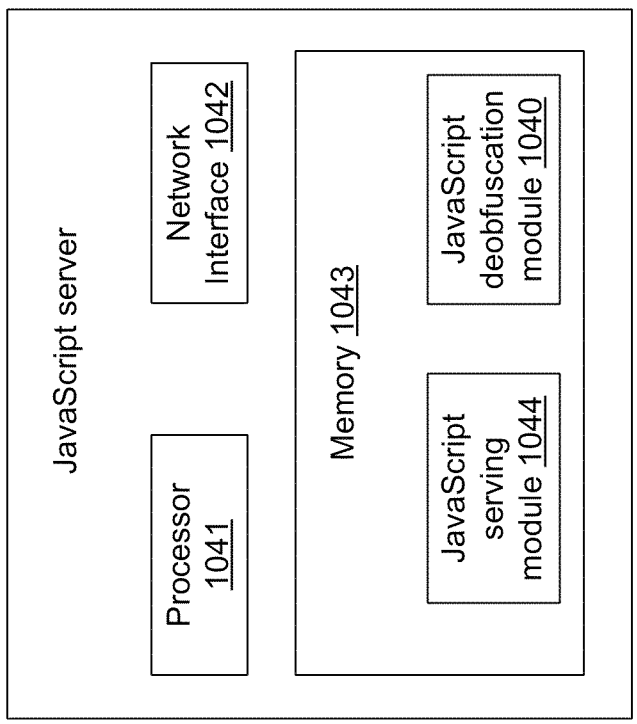
FIG. 4 illustrates a block diagram of an example of the JavaScript server shown in FIG. 1.

FIG. 4 illustrates a block diagram of an example of the JavaScript server 104 shown in FIG. 1. As shown, the JavaScript server 104 may include a processor 1041, a network interface 1042 and a memory 1043. The processor 1041 is configured to execute computer instructions that are stored in a computer-readable medium, for example, the memory 1043. The processor 1041 may be a central processing unit (CPU). The network interface 1042 is configured to allow the JavaScript server 104 to transmit and receive data in the network 102. The network interface 1042 may include one or more network interface cards (NICs). The memory 1043 stores data and instructions. As illustrated, the memory 1043 may store a JavaScript serving module 1044 for serving obfuscated JavaScript from the storage device 105 to user devices 101-1 and 101-2, and a JavaScript deobfuscation module 1040 for receiving deobfuscation requests from the frontend server 103, performing deobfuscation, and sending readable stack traces and/or error messages back to the frontend server 103. The JavaScript deobfuscation module 1040 may also decode error messages, decode stack traces, map line numbers, and handle ambiguous properties based on source maps.

Although FIG. 4 illustrates both JavaScript serving module 1044 and JavaScript deobfuscation module 1040 on the JavaScript server 104, the modules may be distributed across a host of servers. For example, in some aspects a first cluster of servers may implement the JavaScript serving module 1044, while a second cluster of servers may implement JavaScript deobfuscation module 1040. Generally, modules and other functionality described as implemented on a single server or another computing device may be distributed in various server architectures without deviating from the scope of this disclosure.

Figure 5:
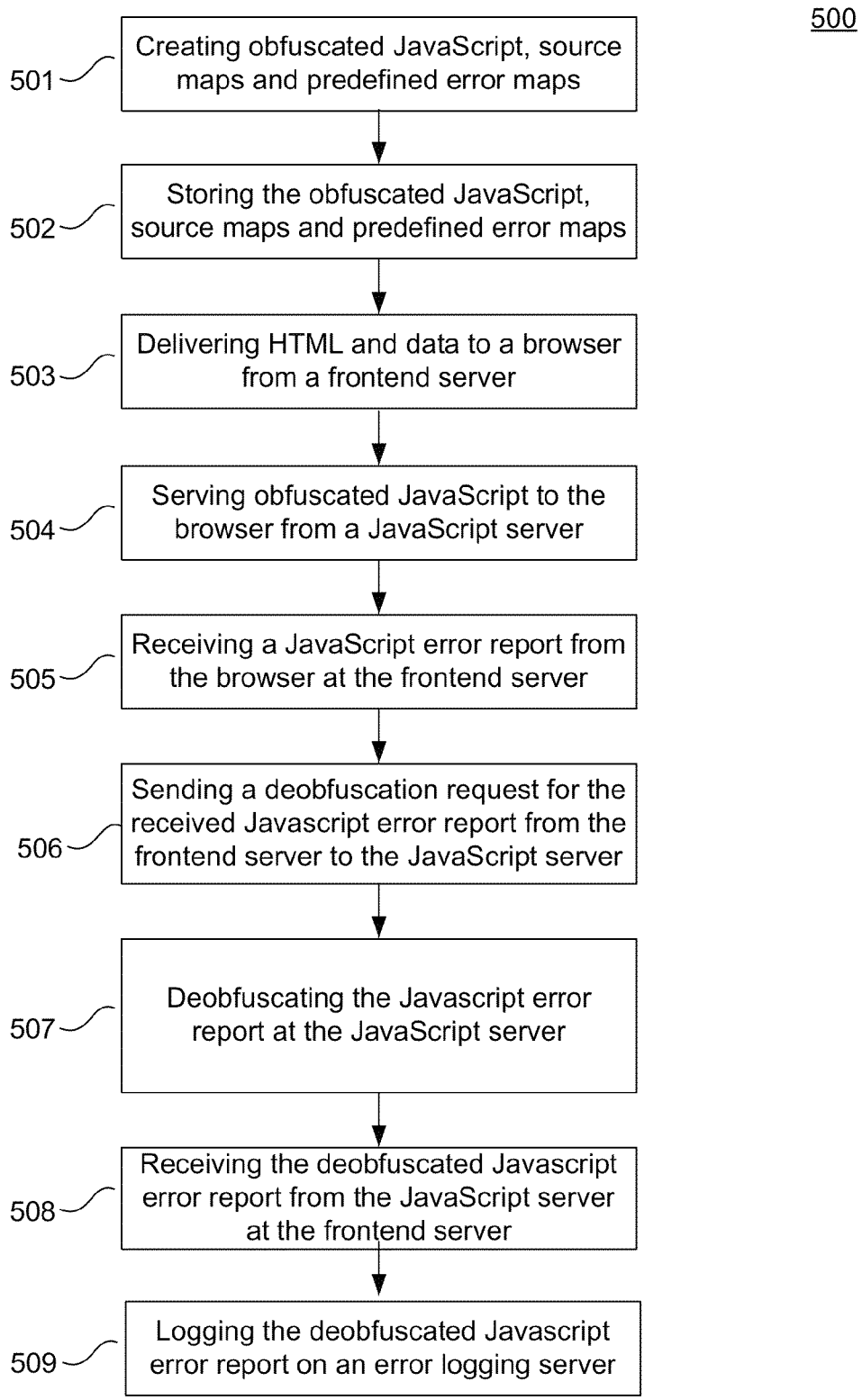
FIG. 5 illustrates a flowchart of an example of a method for remotely deobfuscating obfuscated JavaScript.

FIG. 5 illustrates a flowchart of an example of a method for remotely deobfuscating obfuscated JavaScript.

At 501, JavaScript source code may be received, compressed and compiled to create obfuscated JavaScript, e.g., by the JavaScript compiler 106. Source maps used to deobfuscate JavaScript stack traces and predefined error maps used to deobfuscate error messages may also be created. In one embodiment, the JavaScript source code may be automatically obfuscated.

At 502, the compiled and obfuscated JavaScript, source maps and predefined error maps may be stored, e.g., in the storage device 105.

At 503, HTML and data may be sent to a browser, e.g., from the frontend server 103 to the browser 1010 in the user device 101-1 over the network 102.

At 504, compiled and obfuscated JavaScript may be transmitted, e.g., from the JavaScript server 104 to the browser 1010.

The JavaScript may be executed on a user device, e.g., the user device 101-1. When there is an error, at 505, a JavaScript error report is sent, e.g., from the browser 1010 to the frontend server 103, for monitoring and logging, since the frontend server 103 is login aware and can associate the errors with a logged-in user. The JavaScript error report may contain a JavaScript stack trace and/or an error message that occurred in obfuscated code and contains obfuscated symbols and strings, which need to be deobfuscated before they can be monitored, logged, analyzed and debugged.

At 506, a deobfuscation request for the received JavaScript error reports, is generated at the frontend server 103 and sent from the frontend server 103 to the JavaScript server 104 over the network 102. In one embodiment, the frontend server 103 may determine a target JavaScript server to which the deobfuscation request should be sent to, and send the deobfuscation request to the target JavaScript server. In one embodiment, the target JavaScript server is the JavaScript server which served the obfuscated JavaScript to the browser 1010. In one embodiment, in the HTML from the frontend server 103 to the browser 1010, there is a JavaScript Universal Resource Locator (URL), and the browser 1010 may use the JavaScript URL to request the JavaScript from the JavaScript server 104. The frontend server 103 may use the JavaScript URL to determine the target JavaScript server.

At 507, the received Javascript error report is deobfuscated. Deobfuscation may involve decoding the obfuscated stack traces or error messages in the received Javascript error report. Deobfuscation may be achieved by the JavaScript server 104 with the use of source maps and/or predefined error maps in the storage device 105 as discussed above. The JavaScript server 104 may also decode error messages, decode stack traces, map line numbers, and handle ambiguous properties based on source maps. The deobfuscation of the Javascript error report may result in the creation of readable stack traces and/or error messages of the received Javascript error report.

At 508, the deobfuscated Javascript error report (e.g., readable stack traces and/or error messages) are received by the frontend server 103. In some aspects, the deobfuscated Javascript error report (e.g., the readable stack traces and/or error messages) are received by another server (e.g., a monitoring or analysis server), for example, a server other than the server that initiates the deobfuscation request.

At 509, the deobfuscated error report is logged on an error logging server. The error logging server may be the server that receives the deobfuscated Javascript error report (e.g., the frontend server 103) or another dedicated server for logging purposes or some other server. The logging of the deobfuscated Javascript error report may result in multiple log entries for the readable stack traces and error messages. A deobfuscated Javascript error report may be sent, e.g., by the frontend server 103 to the browser 1010. Monitoring and alerting tools and systems may use the logged deobfuscated Javascript error reports, stack traces, or error messages for monitoring or alerting purposes.

Although FIGS. 1-5 are described with reference to JavaScript, it should be understood that the subject technology may be used with other languages, e.g., Dart.

Figure 6:
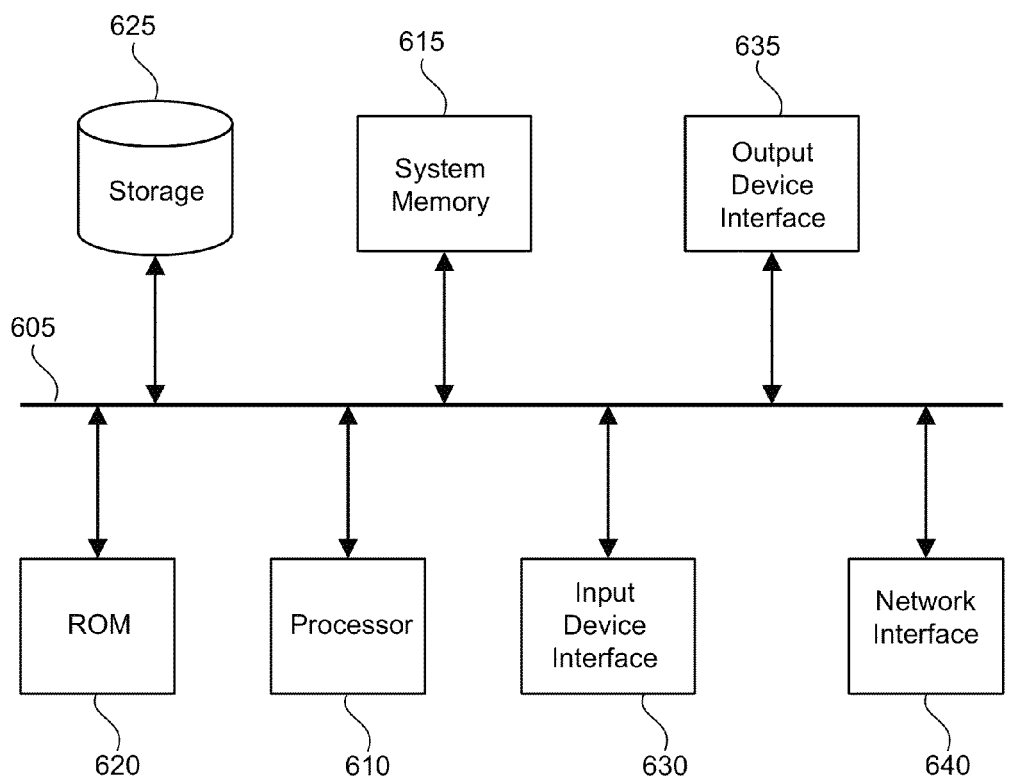
FIG. 6 conceptually illustrates an electronic system with which some implementations of the subject technology are implemented.

FIG. 6 conceptually illustrates an electronic system 600 with which some implementations of the subject technology are implemented. For example, one or more of user devices 101-1 or 101-2, the frontend server 103 and the JavaScript server 104 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for remote deobfuscation of JavaScript in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touchscreen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase, for example, "a configuration" does not imply that such configuration is essential to the subject technology or that such configuration applies to all configurations of the subject technology. A disclosure relating to a configuration may apply to all configurations, or one or more configurations. A phrase, for example, "a configuration" may refer to one or more configurations and vice versa.

What is claimed is:

1. A machine-implemented method, comprising:
   sending obfuscated code from a server to a browser;
   when there is an error during execution of the obfuscated code at the browser, receiving a deobfuscation request including obfuscated information about the error at the server over a network; and
   deobfuscating the obfuscated information in the deobfuscation request at the server.

2. The method of claim 1, wherein the obfuscated code is obfuscated JavaScript.

3. The method of claim 2, further comprising:
   receiving JavaScript source code;
   compiling the JavaScript source code into the obfuscated JavaScript; and
   storing the obfuscated JavaScript.

4. The method of claim 1, further comprising:
   creating a source map used to deobfuscate a stack trace and storing the source map.

5. The method of claim 4, further comprising:
   accessing the stored source map when deobfuscating a stack trace in the deobfuscation request.

6. The method of claim 1, further comprising:
   creating a predefined error map used to deobfuscate an error message; and
   storing the error map.

7. The method of claim 6, further comprising:
   accessing the stored predefined error map when deobfuscating an error message in the deobfuscation request.

8. The method of claim 1, wherein the deobfuscation request is received from a frontend server.

9. The method of claim 8, further comprising:
   sending a readable error message to the frontend server.

10. The method of claim 8, further comprising:
    sending a readable stack trace to the frontend server.

11. A non-transitory computer-readable medium for remotely deobfuscating code, the computer-readable medium comprising instructions that, when executed by a computer, cause the computer to:
    send obfuscated JavaScript to a browser;
    when there is an error during execution of the obfuscated JavaScript at the browser, receive a deobfuscation request including obfuscated information about the error over a network; and
    deobfuscate the obfuscated information in the deobfuscation request.

12. The non-transitory computer-readable medium of claim 11, further comprising instructions that, when executed by the computer, cause the computer to:
    receive JavaScript source code;
    compile the JavaScript source code into the obfuscated JavaScript; and
    store the obfuscated JavaScript.

13. The non-transitory computer-readable medium of claim 11, further comprising instructions that, when executed by the computer, cause the computer to:
    create a source map used to deobfuscate a stack trace; and
    store the source map.

14. The non-transitory computer-readable medium of claim 13, further comprising instructions that, when executed by the computer, cause the computer to:
    access the stored source map when deobfuscating a stack trace in the deobfuscation request.

15. The non-transitory computer-readable medium of claim 11, further comprising instructions that, when executed by the computer, cause the computer to:
    create a predefined error map used to deobfuscate an error message; and
    store the error map.

16. The non-transitory computer-readable medium of claim 15, further comprising instructions that, when executed by the computer, cause the computer to:
    access the stored predefined error map when deobfuscating an error message in the deobfuscation request.

17. A JavaScript system, comprising:
    one or more processors;
    a memory comprising instructions which, when executed by the one or more processors, cause the one or more processors to:
      receive an error report at a frontend server from a browser;
      generate a deobfuscation request including obfuscated information about an error in the error report; and
      send the deobfuscation request from the frontend server over a network.

18. The system of claim 17, wherein the deobfuscation request is sent to a JavaScript server.

19. The system of claim 17, further comprising instructions which, when executed by the one or more processors, cause the one or more processors to:
    receive a readable error message from the JavaScript server after deobfuscation.

20. The system of claim 17, further comprising instructions which, when executed by the one or more processors, cause the one or more processors to:

receive a readable stack trace from the JavaScript server after deobfuscation.

\* \* \* \* \*